United States Patent [19]
Cirot et al.

[11] Patent Number: 5,977,802
[45] Date of Patent: Nov. 2, 1999

[54] CIRCUIT FOR PROCESSING VERTICAL SYNCHRONIZATION SIGNALS INCLUDING A POLARITY DETECTION CIRCUIT

[75] Inventors: Eric Cirot, Fontaine; Nicolas LeBouleux, Grenoble, both of France

[73] Assignee: SGS-Thomson Microelectronics S.A., Saint Genis, France

[21] Appl. No.: 08/922,498

[22] Filed: Sep. 3, 1997

[30] Foreign Application Priority Data

Sep. 9, 1996 [FR] France ................................. 96 11220

[51] Int. Cl.$^6$ ............................................ H04N 5/04
[52] U.S. Cl. ........................... 327/28; 327/172; 345/213
[58] Field of Search ................... 327/28–30, 50, 327/58, 64, 68, 70, 291, 294, 171, 172, 176; 348/525; 345/213

[56] References Cited

U.S. PATENT DOCUMENTS

| | | | |
|---|---|---|---|
| 4,779,132 | 10/1988 | McBeath et al. | 358/148 |
| 4,800,429 | 1/1989 | Perkins | 358/148 |
| 4,859,872 | 8/1989 | Hyakutake | 327/74 |
| 5,132,794 | 7/1992 | Okada et al. | 358/153 |
| 5,159,327 | 10/1992 | Yi | 340/814 |
| 5,349,387 | 9/1994 | Fan Chiang et al. | 348/525 |
| 5,394,171 | 2/1995 | Rabii | 345/213 |
| 5,404,153 | 4/1995 | Kim | 345/213 |

OTHER PUBLICATIONS

French Search Report from French Patent Application 96 11220, filed Sep. 9, 1996.

*Primary Examiner*—Tuan T. Lam
*Attorney, Agent, or Firm*—Wolf, Greenfield & Sacks, P.C.

[57] ABSTRACT

The present invention relates to a circuit for processing vertical synchronization logic signals of positive or negative polarity. Based on signals locating, on the one hand, the presence of the beginning of a pulse and, on the other hand, the rising and falling edges in the synchronization signals, a brief pulse is provided in a signal generated by a one-shot. This pulse induces the generation of edges in signals controlling a latch which generates a logic detection signal. According to the polarity of the received signals, the latch is set or reset and the state of the detection signal indicates the polarity of the synchronization signals.

39 Claims, 2 Drawing Sheets

CIRCUIT FOR PROCESSING VERTICAL SYNCHRONIZATION SIGNALS INCLUDING A POLARITY DETECTION CIRCUIT

BACKGROUND OF THE INVENTION

1. Field of the Invention

The present invention relates to a circuit for processing vertical synchronization signals including a circuit for detecting the polarity of the received signals.

2. Discussion of the Related Art

To control the display of images on a cathode-ray tube of a monitor or of a television screen and, more specifically, to control the scanning of an electron beam on a screen, synchronization signals are used. The synchronization signals contain time information enabling determination of the beginning of the lines (horizontal synchronization) and of the frames (vertical synchronization). A frame is the set of lines required to form an image on a screen. The synchronization signals are logic pulse signals mainly defined by the polarity of their pulses (which is positive or negative according to whether the rising edges or the falling edges are taken into account), the recurrence frequency of the pulses, and their duration.

The vertical synchronization signals are transmitted directly, or in a compound signal including both the vertical and horizontal synchronization signals.

A conventional method for controlling the vertical scanning consists in generating, by means of an oscillator, a sawtooth-shaped signal based on the received vertical synchronization pulse signal. If the received signal is a compound signal, a vertical synchronization signal extracted from the compound signal will have been previously provided, this extracted signal being then used to generate the sawtooth-shaped signal. The sawtooth-shaped signal conventionally has the same frequency as the received pulse signal and a fixed amplitude (this latter characteristic being controlled by an automatic gain control loop, or AGC).

FIG. 1 schematically illustrates a circuit 2 for processing a vertical synchronization signal VIN. Circuits TDA 9103 and TDA 9105 of SGS-THOMSON Microelectronics implement such a circuit. Circuit 2 includes an input 4 for receiving signal VIN which can be of positive or negative polarity. The vertical display is always constructed in the same way (from the top of the screen to the bottom), an input interface circuit 6 receives signal VIN and generates from this signal a logic pulse signal SYNC of fixed polarity and having a recurrence frequency identical to that of signal VIN. It will be for example assumed that signal SYNC has a negative polarity. This signal SYNC is supplied to an oscillator control circuit 8. This circuit 8 controls the charge and the discharge of a capacitor 10 across which a sawtooth-shaped signal VOSC is generated. Capacitor 10 is charged with a current IOSC supplied by an automatic gain control loop 12.

A switch (in FIG. 1, it is a MOS-type N-channel transistor 14) and a resistor 16, mounted in series, are placed in parallel across capacitor 10. The switch is controlled by circuit 8 so that the capacitor charges when the switch is open, and that it discharges through the switch when the switch is closed.

Signal VOSC is supplied to circuit 8 via an operational amplifier 18 mounted as a follower (the signal supplied by amplifier 18 is referred to as VOUT). Circuit 8 includes a comparator circuit for comparing signal VOUT with a potential VMIN, and an edge detector, so that the sawtooth-shaped signal oscillates between value VMIN and a value corresponding to the occurrence of a type of edge in signal SYNC, for example, the falling edges. Thus, signal VOSC has a frequency corresponding to the frequency of the received synchronization signal. To ensure that signal VOSC has a constant amplitude, the automatic gain control circuit which controls the charge current of capacitor 10 is used, so that the value reached by signal VOSC upon occurrence of the falling edges in signal SYNC corresponds to a check value.

Finally, signal VOUT is supplied to an output stage 20 which will issue a sawtooth-shaped signal CDV. The output stage will, for example, set the gain and the mean value of output signal CDV. The sawtooth-shaped signal CDV is supplied to a circuit which converts it into a current signal, this current signal being issued to the vertical deflectors.

FIG. 2 illustrates an example of implementation of an input interface circuit 6. It is assumed that an output signal SYNC with a negative polarity is provided, whatever the polarity of the signal VIN received. It will further be assumed that signal VIN is at a potential VCC of 5 volts when it is in the high state and at a ground potential GND of 0 volts when it is in the low state, and that signal SYNC is at a potential VH of 8 volts when it is in the high state and at potential GND when it is in the low state. The logic circuits of circuit 6 will be supplied by potentials VCC, VH, and GND.

Circuit 6 includes an input comparator 22 which receives signal VIN on its "−" input and a potential REF1, for example from 2 to 2.5 volts, on its "+" input. This comparator provides a logic signal A. An inverter 24 receives signal A as an input and provides a logic signal B, which is the inverse of signal A.

Signal A controls a switch 26 mounted between the ground and the input of an inverter 28. The switch is open when signal A is in a first state, and it is closed when signal A is in a second state. In the example described, the first state will be the low state and the second state is the high state. A current source 30 providing a current 2I1 and, on the other hand, a capacitor 32, are mounted in parallel to switch 26. A current source 34 is connected to the input of inverter 28. It provides a current I1. Thus, capacitor 32 will be charged or discharged with a constant current, according to whether switch 26 is closed or open. The potential at the input of inverter 28 will be referred to as VC1.

Inverter 28 provides a logic signal D. This signal D is inverted in an inverter 36 and the logic signal generated by inverter 36 is referred to as E. This signal E and signal B are supplied to a two-input NOR-type logic gate 38 which provides a logic signal SET1. Besides, signals D and A are supplied to a two-input NOR-type gate 40 which provides a logic signal SET2.

An RS-type double flip-flop 42 receives signals SET1 and SET2 on its set inputs (referred to as S1 and S2). The flip-flop further receives logic control signals RESET and SECINH on its reset inputs (referred to as R1 and R2). Signal SECINH is, for example, provided by a starting detection circuit so that it switches from a first to a second state when the circuit is supplied. It is here assumed that the first and second states respectively are the low state and the high state. Signal RESET sets the duration of the pulses in signal SYNC. It is typically generated based on the detection of two thresholds on the sawtooth-shaped signal generated by capacitor 10. Flip-flop 42 provides a logic signal F. Signal F is inverted in an inverter 44 which provides a logic signal NF, which is the inverse of signal F. Signal NF is used to control a switch 46 mounted between the ground and a first terminal of a capacitor 48. The second terminal of capacitor 48 is connected to the ground. A current source 50 provides a current I2. It is connected to the first terminal of capacitor 48, so that capacitor 48 is charged or discharged with a constant current according to whether switch 46 is open or closed. The voltage across capacitor 48 will be referred to as VC2. Voltage VC2 is compared to a fixed potential REF2, for example from 6 to 7 volts, in a comparator 52. This comparator provides a logic signal G which is representative of the result of the comparison. This signal is inverted in an inverter 54, which provides a logic signal NG. An inverter 56 inverts signal NG to provide logic signal SYNC. Signals SYNC and F are supplied to a two-input NAND-type logic gate 58 which provides a logic signal NSAMP. This signal is inverted in an inverter 60 which provides a logic signal SAMP which is the inverse of signal NSAMP.

Assume, as illustrated in FIGS. 5a to 5e showing signals VIN, SAMP, SYNC, VOSC, and RESET, that signal VIN is of positive polarity. The synchronization pulses are characterized by a rising edge subsequently followed by a falling edge. Further assume that signals SAMP, B, D, SET1, SET2, F, and VC2 are in the low state, and that signals SYNC, A, VC1, and G are in the high state.

When the rising edge marking the beginning of the pulse appears, signal A switches to the low state when the switching threshold of comparator 22 is reached. Switch 26 is then open and capacitor 32 discharges with a constant current. Concurrently, signal SET1 switches to the high state. It remains in this high state as long as the switching threshold of inverter 28, which could be placed at 4 volts, is not reached and signal E has not changed state. Signal F will thus switch to the high state. Accordingly, capacitor 48 starts charging. Concurrently, signal NSAMP switches to the low state, and signal SAMP switches to the high state. Once threshold REF2 has been reached by signal VC2, signal G (and accordingly, signal SYNC) switches to the low state. This induces signal SAMP to switch back to its original state. Potential REF2 will set the delay during which signal SAMP is in the high state.

When the rising edge marking the end of the synchronization pulse appears, signal A switches back to the high state. Capacitor 32 will thus be charged again. As long as the switching threshold of inverter 28 is not reached, both signals B and E are in the low state. Signal SET2 will thus rise to the high state during this time interval. Once the threshold has been reached, signal E switches to the high state and signal SET2 switches back to the low state. To mark the end of the negative pulse in SYNC, it is enough to provide a rising edge in signal RESET. The signals are then set back to their initial states.

If it is assumed that signal VIN is negatively polarized, a signal SYNC with a negative polarity will be similarly provided. Conversely, the setting signal SYNC to the low state will be controlled by signal SET2 which will mark the beginning of the synchronization pulses.

FIG. 3 illustrates an example of implementation of circuit 12.

It includes an input 62 for receiving the signal VOSC to be regulated, an input 64 for receiving a check signal VREF, an input 66 for receiving signal SAMP, an input 68 for receiving a logic enable control signal NOSYNCHRO and an output 70 for providing the output current IOSC.

Input 62 is connected to an amplifier 72 mounted as a follower which provides a signal VOSCA. The "+" input of amplifier 72 is connected to input 62. Its "−" input is connected to its output. Amplifier 72 allows the input impedance of circuit 12 to be controlled so that no current is taken from capacitor 10. The output of amplifier 72 is connected to the "+" input of an amplifier 74. The "−" input of this amplifier 74 is connected on the one hand to input 64 via a resistor 76 and on the other hand to its output, via a resistor 78. The output of amplifier 74 is also connected to a first pole of a capacitor 84, via a resistor 80 and a switch 82 mounted in series. Switch 82 is controlled by signal SAMP. The switch will be implemented so as to be closed if signal SAMP is in the high state, and open otherwise. The second pole of capacitor 84 is connected to a ground. The voltage across capacitor 84 is referred to as VSAMP. The first pole of this capacitor is further connected to input 64 via a switch 86 controlled by signal NOSYNCHRO and to the "+" input of an amplifier 88 mounted as a follower. The "−" input of amplifier 88 is connected to its output. Input 64 is connected to the "+" input of an amplifier 92 mounted as a follower. The "−" input of this amplifier is connected to its output. The outputs of amplifiers 92 and 88 are interconnected via a resistor 90. A current mirror 94 copies the current I'0 running through this resistor. A current source 96 further provides a reference current I0. Current mirror 94 and current source 96 are connected to output 70, so that this output provides current IOSC by adding currents I0 and I'0.

Let Cosc be the value of capacitor 10. Cosc.VOSC=IOSC.T with T corresponding to the charging time of capacitor 10, assuming a very fast discharge. 10 is constant and I'0=(VREF−VSAMP)/R with R being the value of resistor 90. If the potential provided at the output of amplifier 74 is referred to as V1, the potential on the "−" input of this amplifier is referred to as Vh and the values of resistors 78 and 76 are referred to as R1 and R2, then (V1−Vh)/R2=(Vh−VREF)/R2.

Thus, V1=A.(Vh−VREF)+VREF with A=1=R1/R2.

When switch 82 closes, then capacitor 84 charges until VSAMP=V1. Signal VOSC is then close to its maximum value before the discharge on the falling edge of signal SYNC. Then, I'O=A.(VREF−Vh)/R. The system converges towards Vh=VREF, which then practically corresponds to the maximum value reached by signal VOSC, with this signal VOSC then oscillating between VMIN and VREF at a frequency f=1/T which is the recurrence frequency of the received vertical synchronization pulses. Signal NOSYNCHRO allows the potential VREF to be applied to the input of amplifier 88, typically in the absence of a synchronization signal to be processed. Then, IOSC=I0. Circuit 2 then provides a signal VOSC with a so-called free frequency, the value of which is given by the value of current I0.

An aim of the present invention is to provide a vertical synchronization processing circuit such as illustrated in FIGS. 1 and 2, which includes a circuit for detecting the polarity of the received synchronization signal.

A solution is to provide an analog detection. This solution is difficult to implement. As an example, in monitors, the recurrence frequency may range from 50 to 165 hertz, which corresponds to a period which can range from 6 to 20 milliseconds. According to screen display standards, the width of the synchronization pulses may reach 15% of the period, that is, up to 3 milliseconds. To detect the polarity of such pulses, a time constant of 3 milliseconds at least may be implemented, which would require a large capacitance (several tens of picofarads) which is not easily integrable, and a current of low value (several tens of nanoamperes) which is not easily implementable.

SUMMARY OF THE INVENTION

The present invention provides a logic detection of the polarity of the received vertical synchronization pulses which is easily integrable and compact.

Thus, the present invention provides a circuit for processing logic vertical synchronization signals of positive or negative polarity including means for generating, on the one hand, a first and a second logic pulse signals to respectively locate rising and falling edges in a received synchronization signal, and for generating, on the other hand, a third logic signal which switches to a given logic state when a rising or falling edge marking the beginning of a positive or negative pulse appears in the received synchronization signal. The circuit includes a circuit for detecting the polarity of the received synchronization signal, this detection circuit including a one-shot, logic gates and a latch. The latch permanently receives a first logic state on an input. The one-shot generates a fourth signal so that a brief pulse appears in this signal when the third signal switches to the given state which is representative of the presence of an edge marking the beginning of a pulse in the received synchronization signal. The logic gates receive this fourth signal and the first and second signals to provide set and reset control signals. The latch provides a logic detection signal which reproduces the state that it receives on its input when it is being set and which switches to a second state when reset. The logic gates are arranged so that, the third signal having switched to the given state which is representative of the presence of an edge marking the beginning of a pulse in the received synchronization signal, the latch is set when one of the first or second signals is in a given state indicating the presence of an edge of a given type in the synchronization signal, and it is reset when the other of the first or second signals is in a given state indicating the presence of an edge of another type in the synchronization signal, so that the state of the signal generated by the latch is representative of the polarity of the received synchronization signal.

BRIEF DESCRIPTION OF THE DRAWINGS

Other advantages and characteristics of the present invention will appear from the following non-limiting description of examples of implementation of the present invention, taken in conjunction with the accompanying drawings, among which.

DETAILED DESCRIPTION

To detect the polarity of the received synchronization signal VIN, signals SET1 and SET2 which respectively detect the rising and falling edges of the synchronization signal will be used. If both signals SET1 and SAMP are in the high state, the polarity is positive and if both signals SET2 and SAMP are in the high state, the polarity is negative. A problem arises if the width of the synchronization pulses is lower than the duration of the positive pulses in signal SAMP because in this case, signals SET1 and SET2 are superposed. As seen, the duration of the pulses in signal SAMP is set by the value of REF2, independently from the duration of the synchronization pulses. A solution is to decrease the duration of the positive pulses in signal SAMP. This may have a disadvantage due to the fact that this duration must be taken into account in the stability calculation of the automatic gain control loop. This duration will thus be in practice around ten microseconds. In the present invention, a one-shot is used to create from signal SAMP a signal of much shorter duration, for example of around one hundred nanoseconds.

Figure 1:
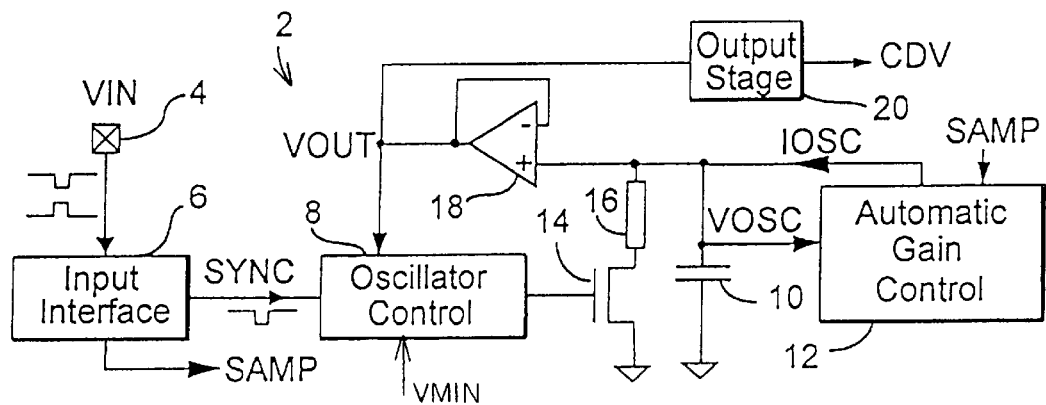
FIG. 1 schematically illustrates a circuit for processing a vertical synchronization signal.
Figure 2:
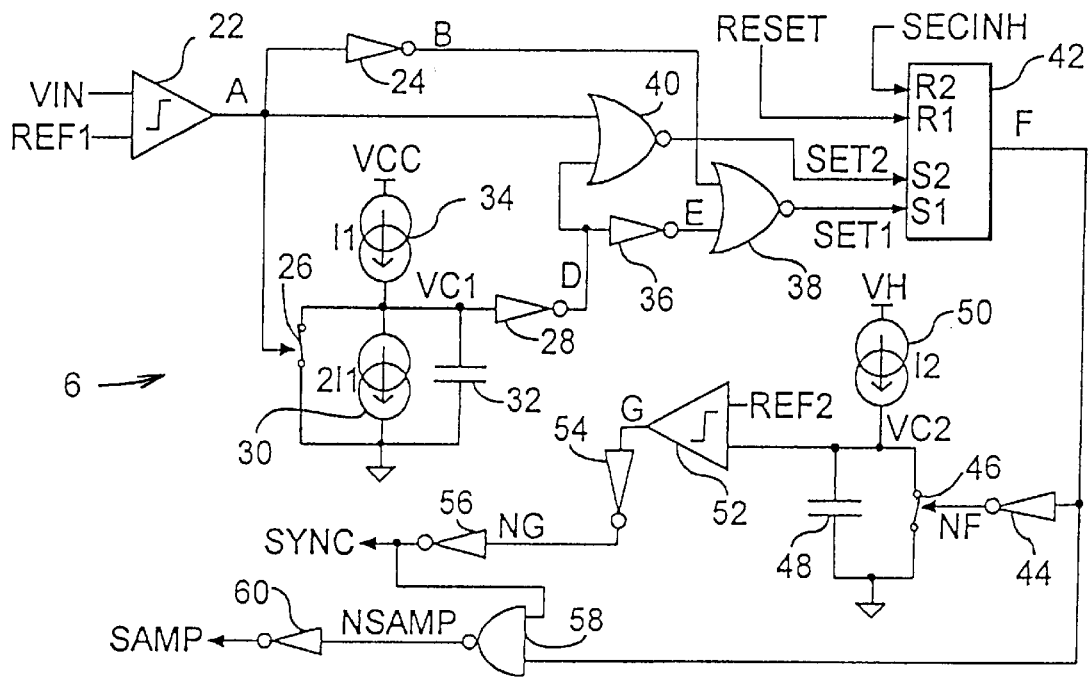
FIG. 2 illustrates an input interface circuit implemented in the circuit illustrated in FIG. 1.
Figure 3:
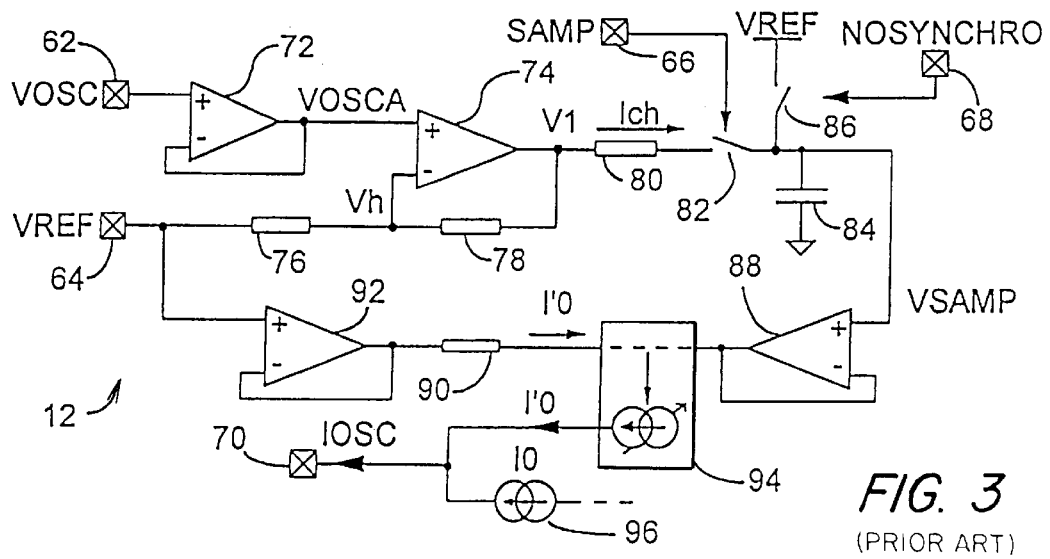
FIG. 3 illustrates an automatic gain control circuit implemented in the circuit illustrated in FIG. 1.
Figure 4:
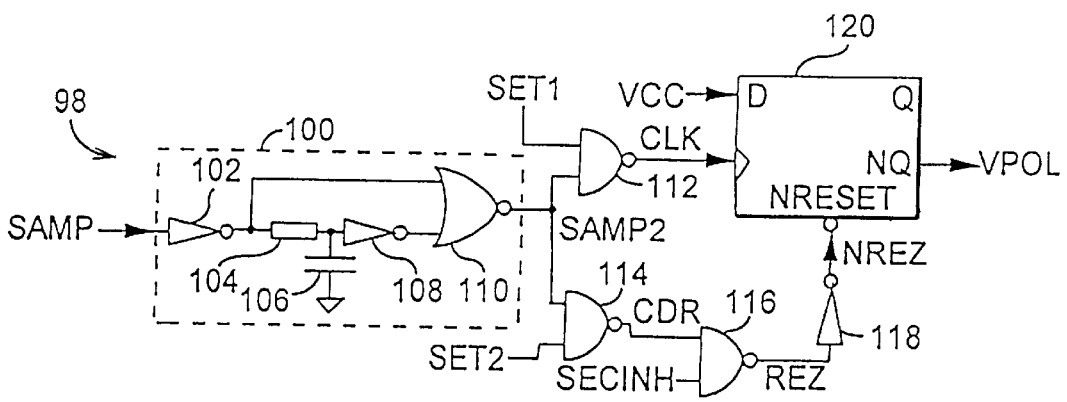
FIG. 4 illustrates a polarity detection circuit implemented according to the present invention.
Figure 5A:
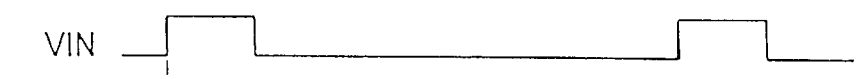
FIGS. 5a to 5e illustrate timing diagrams of signals implemented in the circuit of FIG. 1.
Figure 5B:
Figure 5C:
Figure 5D:
Figure 5E:
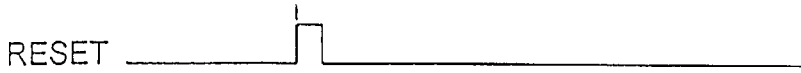

FIG. 4 illustrates a polarity detection circuit 98 implemented according to the present invention.

It includes a one-shot 100 which receives signal SAMP and generates a logic signal SAMP2 of same polarity. One-shot 100 includes, in the illustrated example, an inverter 102, a resistor 104, a capacitor 106, an inverter 108, and a two-input NOR-type logic gate 110. Resistor 104 is mounted between the output of inverter 102 and the input of inverter 108. Capacitor 106 is mounted between the input of inverter 108 and the ground. The outputs of inverters 102 and 108 are connected to the inputs of gate 110. This gate provides signal SAMP2.

When signal SAMP is in the low state, the signal provided by inverter 102 is in the high state. Accordingly, signal SAMP2 is in the low state.

When a rising edge appears in signal SAMP (thus marking the beginning of a vertical synchronization pulse), a falling edge appears at the output of inverter 102. Signal SAMP2 then switches to the high state. Concurrently, capacitor 106, assumed to be initially charged, starts to discharge. The assembly of resistor 104 and capacitor 106 defines an RC filter. The values of these components will define the discharge slope. A delay between the falling edge at the output of inverter 102 and the time when this edge is reflected on the input of inverter 108 is thus induced. Once the switching threshold of inverter 108 has been reached, a rising edge appears on the output of this inverter. Signal SAMP2 will switch to the high state between the time when the signal provided by inverter 102 switches to the low state and the time when the signal provided by inverter 108 switches to the high state. By choosing, for example, a resistor 104 of 50 kiloohms and a capacitor 106 of 5 picofarads, the width of the pulse created at the output of the gate 110 will be 150 nanoseconds.

Signal SAMP2 is provided to two NAND-type two-input logic gates 112 and 114. Gate 112 receives, in addition to signal SAMP2, logic signal SET1 which locates the rising edges in the received synchronization signal VIN. Gate 114 receives, in addition to signal SAMP2, signal SET2 which locates its falling edges in the received synchronization signal VIN. Gate 112 provides a set control logic signal CLK. Gate 114 provides a logic signal CDR. This signal is supplied to a NAND-type logic gate 116 which also receives logic signal SECINH. This gate 116 provides a logic signal REZ which is supplied to an inverter 118. This inverter 118 provides a logic reset control signal NREZ which is the inverse of signal REZ.

The circuit finally includes a latch 120. It receives on its D input a high logic state (this input receives potential VCC). Its locking control input receives signal CLK. Its reset input receives signal NREZ. Finally, its inverting input NQ provides a logic detection signal VPOL, representative of the polarity of the received synchronization signal VIN.

Assume that signals SET1 and SET2 are in the low state and that signals VPOL and SECINH are in the high state. If a synchronization signal of positive polarity is received, signals SET1 and SAMP2 will switch to the high state. During the period when these two signals are in the high state, that is, in practice, during the period when signal SAMP2 is in the high state, signal CLK switches to the low state. It then switches back to the high state. A negative pulse is thus created in signal CLK. The rising edge marking the end of this pulse causes the setting of latch 120. This latch then reproduces on its inverting input the inverse state of that present on its D input. Signal VPOL switches to the low state, which is representative of a positive polarity. If, subsequently, the synchronization signal has a negative polarity, a negative pulse is similarly provided in signal CDR. A positive pulse is thus created in signal REZ and a negative pulse is created in signal NREZ. A reset of latch 120 is thus induced upon occurrence of the rising edge marking the end of this pulse. Signal VPOL thus switches to the high state, which is representative of a negative polarity.

It should be noted that gates 112 and 114 could have been inverted, signal VPOL being then representative, on the one hand, of a positive polarity when in the high state, and on the other hand, of a negative polarity when in the low state. Signal CDR could also be directly supplied to the reset input of latch 120. Taking into account of signal SECINH enables, at the starting of the circuit, imposition of a known state at the output of latch 120. At the starting of the circuit, signal SECINH switches from the low state to the high state. Latch 120 is thus reset and, by default, signal VPOL will be representative of a negative polarity. Of course, the inverse convention could be chosen.

Of course, the present invention is likely to have various alterations, modifications, and improvements which will readily occur to those skilled in the art. Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claim and the equivalents thereto.

What is claimed is:

1. A circuit for processing logic a vertical synchronization signal of positive or negative polarity including means for generating, on the one hand, a first and a second logic pulse signals to respectively locate rising and falling edges in a received vertical synchronization signal, and for generating, on the other hand, a third logic signal which switches to a given logic state when a rising or falling edge marking the beginning of a positive or negative pulse appears in the received vertical synchronization signal, including a circuit for detecting the polarity of the received vertical synchronization signal, the detection circuit including a one-shot logic circuit, logic gates and a latch, the latch permanently receiving a first logic state on an input, the one-shot logic circuit generating a fourth signal so that a pulse appears in the fourth signal when the third logic signal switches to the given logic state which is representative of the presence of said rising or falling edges marking the beginning of a positive or negative pulse in the received vertical synchronization signal, the logic gates receiving the fourth signal and the first and second logic pulse signals to provide set and reset control signals, the latch providing a logic detection signal which reproduces a first state that it receives on its input when it is being set and which switches to a second state when reset, the logic gates being arranged so that when the third signal having switched to the given logic state which is representative of the presence of said rising or falling edges marking the beginning of a positive or negative pulse in the received vertical synchronization signal, the latch is set when one of the first or second logic pulse signals is in a state indicating the presence to one of the rising and falling edges in the received vertical synchronization signal, and it is reset when the other of the first or second logic pulse signals is in a state indicating the presence of the other one of the rising and falling edges having a second polarity in the received vertical synchronization signal, so that the state of the logic detection signal generated by the latch is representative of the polarity of the received synchronization vertical signal, wherein said means for generating the first and second logic pulse signals includes an input interface circuit.

2. A circuit according to claim 1, wherein said one-shot comprises a one-shot logic circuit that has its fourth signal of a pulse duration substantially shorter than that of the input to the one-shot, namely said third logic signal.

3. A circuit according to claim 2, wherein said one-shot logic circuit comprises at least an input inverter and a two-input NOR-type logic gate.

4. A circuit according to claim 3, wherein said one-shot logic circuit has a first path in which an output of the input inverter couples directly to one input of the NOR-type logic gate and a second path including a charging means for coupling from said output of the input inverter to a second input of the NOR-type logic gate.

5. A circuit according to claim 4, wherein said second path includes a resistor and a second inverter.

6. A circuit according to claim 5, wherein said charging means comprises a capacitor.

7. A circuit according to claim 6, wherein said resistor is connected in series with said second inverter.

8. A circuit according to claim 7, wherein said capacitor is connected from a joining point between said resistor and said second inverter to ground potential.

9. A circuit according to claim 8, wherein said logic gates comprise a pair of two input gates.

10. A circuit according to claim 9, wherein said two input gates are each a NAND-type logic gate.

11. A circuit according to claim 10, including means for connecting the output of the two-input NOR-type logic gate of the one-shot logic circuit to one input of both said NAND-type logic gates.

12. A circuit according to claim 11, wherein said logic gates further include a third NAND-type logic gate coupled to the output of one of said pair of two input NAND-type logic gates.

13. A circuit according to claim 12, further including a third inverter coupled from said third NAND-type logic gate to said latch.

14. A circuit according to claim 13, wherein said latch comprises a bistable device having a clock input, D input, reset input and at least one output.

15. A circuit according to claim 1, wherein said logic gates comprise a pair of two input gates.

16. A circuit according to claim 15, wherein said two input gates are each a NAND-type logic gate.

17. A circuit according to claim 16, including means for connecting the output of the one-shot logic circuit to one input of both said NAND-type logic gates.

18. A circuit according to claim 17, wherein said logic gates further include a third NAND-type logic gate coupled to the output of one of said pair of two input NAND-type logic gates.

19. A circuit according to claim 18, further including a third inverter coupled from said third NAND-type logic gate to said latch.

20. A circuit according to claim 1, wherein said latch comprises a bistable device having a clock input, D input, reset input and at least one output.

21. A circuit for detecting a polarity of a received synchronization signal having first and second logic pulse signals to respectively locate rising and falling edges in the received synchronization signal, and a third logic signal which switches to a first logic state when a rising or falling edge marking the beginning of a positive or negative pulse appears in the received synchronization signal, and comprising a first circuit having an input for providing an output pulse signal of a duration substantially shorter than the third logic signal at the input, a second circuit that includes a plurality of logic gates and a latch, said first circuit generating the output pulse signal having the first logic state which is representative of the presence of said rising or falling edge marking the beginning of a positive or negative pulse in the received synchronization signal, said logic gates providing set and reset control signals in response to said output signal, said first and second logic pulse signals, said latch coupled to said logic gates for providing a logic detection signal which reproduces a state that it receives on its input when it is being set and which switches to another state when reset, the logic gates being arranged so that, the logic detection signal having switched to the first logic state which is representative of the presence of said rising or falling edge marking the beginning of a positive or negative pulse in the received synchronization signal, the latch is set when one of the first and second signals logic pulse is in a state indicating the presence of one of said rising and falling edges in the received synchronization signal, and the latch is reset when the other of the first and second logic pulse signals is in a state indicating the presence of the other one of said rising and falling edges in the received synchronization signal, so that the state of the logic detection signal generated by the latch is representative of the polarity of the received synchronization signal, wherein said first circuit comprises a one-shot logic circuit.

22. A circuit according to claim 21, wherein said one-shot logic circuit comprises at least an input inverter and a two-input NOR-type logic gate.

23. A circuit according to claim 22, wherein said one-shot logic circuit has a first path in which an output the input inverter couples directly to one input of the NOR-type logic gate and a second path including a charging means for coupling from said output of said input inverter to a second input of the NOR-type logic gate.

24. A circuit according to claim 23, wherein said second path includes a resistor and a second inverter.

25. A circuit according to claim 24, wherein said charging means comprises a capacitor.

26. A circuit according to claim 25, wherein said resistor is connected in series with said second inverter.

27. A circuit according to claim 26, wherein said capacitor is connected from a joining point between said resistor and said second inverter to ground potential.

28. A circuit according to claim 27, wherein said logic gates comprise a pair of two input gates.

29. A circuit according to claim 28, wherein said two input gates are each a NAND-type logic gate.

30. A circuit according to claim 29, including means for connecting the output of the two-input NOR-type logic gate of the one-shot logic circuit to one input of both said NAND-type logic gates.

31. A circuit according to claim 30, wherein said logic gates further include a third NAND-type logic gate coupled to the output of one of said pair of two input NAND-type logic gates.

32. A circuit according to claim 31, further including a third inverter coupled from said third NAND-type logic gate to said latch.

33. A circuit according to claim 32, wherein said latch comprises a bistable device having a clock input, D input, reset input and at least one output.

34. A circuit according to claim 21, wherein said logic gates comprise a pair of two input gates.

35. A circuit according to claim 34, wherein said two input gates are each a NAND-type logic gate.

36. A circuit according to claim 35, including means for connecting the output of the one-shot logic circuit to one input of both said NAND-type logic gates.

37. A circuit according to claim 36, wherein said logic gates further include a third NAND-type logic gate coupled to the output of one of said pair of two input NAND-type logic gates.

38. A circuit according to claim 37, further including a third inverter coupled from said third NAND-type logic gate to said latch.

39. A circuit according to claim 21, wherein said latch comprises a bistable device having a clock input, D input, reset input and at least one output.

* * * * *